(12) United States Patent
Palmer et al.

(10) Patent No.: US 7,916,857 B2
(45) Date of Patent: *Mar. 29, 2011

(54) METHODS, SYSTEMS, AND COMPUTER READABLE MEDIA FOR SELECTIVELY PROCESSING OR REDIRECTING SIGNALING CONNECTION CONTROL PART (SCCP) MESSAGES

(75) Inventors: Jonathan J. Palmer, Durham, NC (US);
Devesh Agarwal, Raleigh, NC (US);
Robby D. Benedyk, Angier, NC (US)

(73) Assignee: Tekelec, Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/706,837

(22) Filed: Feb. 15, 2007

(65) Prior Publication Data
US 2007/0207802 A1    Sep. 6, 2007

Related U.S. Application Data (60) Provisional application No. 60/773,604, filed on Feb. 15, 2006.

(51) Int. Cl.
*H04M 7/00* (2006.01)
(52) U.S. Cl. ............ 379/229; 379/230; 379/88.17; 379/221.08; 379/221.12
(58) Field of Classification Search .......... 379/229, 379/230, 88.17, 221.08, 221.12
See application file for complete search history.

(56) References Cited

U.S. PATENT DOCUMENTS

| | | |
|---|---|---|
| 4,310,727 A | 1/1982 | Lawser |
| 4,754,479 A | 6/1988 | Bicknell et al. |
| 5,089,954 A | 2/1992 | Rago |
| 5,237,604 A | 8/1993 | Ryan |
| 5,247,571 A | 9/1993 | Kay et al. |
| 5,251,248 A | 10/1993 | Tokunaga et al. |
| 5,400,390 A | 3/1995 | Salin |
| 5,420,916 A | 5/1995 | Sekiguchi |
| 5,422,941 A | 6/1995 | Hasenauer et al. |
| 5,423,068 A | 6/1995 | Hecker |

(Continued)

FOREIGN PATENT DOCUMENTS

EP    0 512 962 A2    11/1992

(Continued)

OTHER PUBLICATIONS

Notification of Transmittal of the International Search Report and the Written Opinion of the International Searching Authority, or the Declaration for International Application No. PCT/US07/04175 (Jul. 22, 2008).

(Continued)

*Primary Examiner* — Quynh H Nguyen
(74) *Attorney, Agent, or Firm* — Jenkins, Wilson, Taylor & Hunt, P.A.

(57) ABSTRACT

The subject matter described herein includes methods, systems, and computer program products for selectively processing or redirecting SCCP messages. According to one method, an SCCP message addressed to an STP and sent route-on-PC-SSN is received at the STP. It is determined whether the SCCP message can be processed locally by the STP. In response to determining that the SCCP message can be processed locally by the STP, the SCCP message is terminated, processed locally, and a response is sent to the message originator. In response to determining that the message cannot be processed locally at the STP, the SCCP message is redirected to a destination.

17 Claims, 4 Drawing Sheets

U.S. PATENT DOCUMENTS

| | | | |
|---|---|---|---|
| 5,430,719 A | 7/1995 | Weisser, Jr. | |
| 5,442,683 A | 8/1995 | Hoogeveen | |
| 5,455,855 A | 10/1995 | Hokari | |
| 5,457,736 A | 10/1995 | Cain et al. | |
| 5,475,732 A * | 12/1995 | Pester, III | 379/32.01 |
| 5,481,603 A | 1/1996 | Gutierrez et al. | |
| 5,502,726 A | 3/1996 | Fischer | |
| 5,504,804 A | 4/1996 | Widmark et al. | |
| 5,526,400 A | 6/1996 | Nguyen | |
| 5,579,372 A | 11/1996 | Äström | |
| 5,590,398 A | 12/1996 | Matthews | |
| 5,594,942 A | 1/1997 | Antic et al. | |
| 5,623,532 A | 4/1997 | Houde et al. | |
| 5,689,548 A | 11/1997 | Maupin et al. | |
| 5,706,286 A | 1/1998 | Reiman et al. | |
| 5,711,002 A | 1/1998 | Foti | |
| 5,812,639 A * | 9/1998 | Bartholomew et al. | 370/352 |
| 5,819,178 A | 10/1998 | Cropper | |
| 5,822,694 A | 10/1998 | Coombes et al. | |
| 5,832,382 A | 11/1998 | Alperovich | |
| 5,841,854 A | 11/1998 | Schumacher et al. | |
| 5,852,660 A | 12/1998 | Lindquist et al. | |
| 5,854,982 A | 12/1998 | Chambers et al. | |
| 5,862,481 A | 1/1999 | Kulkarni et al. | |
| 5,867,788 A | 2/1999 | Joensuu | |
| 5,878,347 A | 3/1999 | Joensuu et al. | |
| 5,878,348 A | 3/1999 | Foti | |
| 5,889,849 A | 3/1999 | Ban et al. | |
| 5,890,063 A | 3/1999 | Mills | |
| 5,953,662 A | 9/1999 | Lindquist et al. | |
| 5,953,663 A | 9/1999 | Maupin et al. | |
| 5,983,217 A | 11/1999 | Khosravi-Sichannie et al. | |
| 6,006,098 A | 12/1999 | Rathnasabapathy et al. | |
| 6,011,803 A | 1/2000 | Bicknell et al. | |
| 6,014,557 A | 1/2000 | Morton et al. | |
| 6,018,657 A | 1/2000 | Kennedy, III et al. | |
| 6,038,456 A | 3/2000 | Colby et al. | |
| 6,049,714 A | 4/2000 | Patel | |
| 6,094,578 A | 7/2000 | Purcell et al. | |
| 6,097,960 A | 8/2000 | Rathnasabapathy et al. | |
| 6,115,463 A | 9/2000 | Coulombe et al. | |
| H1895 H | 10/2000 | Hoffpauir et al. | |
| 6,128,377 A | 10/2000 | Sonnenberg | |
| 6,134,441 A | 10/2000 | Äström et al. | |
| 6,137,806 A | 10/2000 | Martinez | |
| 6,138,007 A | 10/2000 | Bharatia | |
| 6,138,016 A | 10/2000 | Kulkarni et al. | |
| 6,138,017 A | 10/2000 | Price et al. | |
| 6,138,023 A | 10/2000 | Agarwal et al. | |
| 6,144,857 A | 11/2000 | Price et al. | |
| 6,148,204 A | 11/2000 | Urs et al. | |
| 6,175,743 B1 | 1/2001 | Alperovich et al. | |
| 6,178,181 B1 * | 1/2001 | Glitho | 370/467 |
| 6,192,242 B1 | 2/2001 | Rollender | |
| 6,208,870 B1 | 3/2001 | Lorello et al. | |
| 6,226,517 B1 | 5/2001 | Britt et al. | |
| 6,236,365 B1 | 5/2001 | LeBlanc et al. | |
| 6,263,212 B1 | 7/2001 | Ross et al. | |
| 6,292,669 B1 | 9/2001 | Meuronen et al. | |
| 6,298,232 B1 | 10/2001 | Marin et al. | |
| 6,308,075 B1 | 10/2001 | Irten et al. | |
| 6,324,279 B1 * | 11/2001 | Kalmanek et al. | 379/229 |
| 6,327,350 B1 | 12/2001 | Spangler et al. | |
| 6,338,140 B1 | 1/2002 | Owens et al. | |
| 6,356,529 B1 | 3/2002 | Zarom | |
| 6,363,431 B1 | 3/2002 | Hammer et al. | |
| 6,377,674 B1 | 4/2002 | Chong et al. | |
| 6,377,807 B1 * | 4/2002 | Iparrea et al. | 455/445 |
| 6,411,632 B2 | 6/2002 | Lindgren et al. | |
| 6,421,674 B1 | 7/2002 | Yoakum et al. | |
| 6,424,832 B1 | 7/2002 | Britt et al. | |
| 6,434,127 B1 | 8/2002 | Ha | |
| 6,453,174 B1 | 9/2002 | Cunningham et al. | |
| 6,463,055 B1 | 10/2002 | Lupien et al. | |
| 6,493,551 B1 | 12/2002 | Wang et al. | |
| 6,505,046 B1 | 1/2003 | Baker | |
| 6,512,926 B1 | 1/2003 | Henry-Labordere | |
| 6,515,997 B1 | 2/2003 | Feltner et al. | |
| 6,519,242 B1 | 2/2003 | Emery et al. | |
| 6,519,468 B1 | 2/2003 | Donovan et al. | |
| 6,529,524 B1 | 3/2003 | Liao et al. | |
| 6,535,746 B1 | 3/2003 | Yu et al. | |
| 6,560,216 B1 | 5/2003 | McNiff et al. | |
| 6,560,456 B1 | 5/2003 | Lohtia et al. | |
| 6,574,481 B1 | 6/2003 | Rathnasabapathy et al. | |
| 6,577,723 B1 | 6/2003 | Mooney | |
| 6,594,258 B1 | 7/2003 | Larson et al. | |
| 6,611,516 B1 | 8/2003 | Pirkola et al. | |
| 6,615,037 B1 | 9/2003 | Bharatia et al. | |
| 6,625,461 B1 | 9/2003 | Bertacchi | |
| 6,643,511 B1 | 11/2003 | Rune et al. | |
| 6,662,017 B2 | 12/2003 | McCann et al. | |
| 6,683,881 B1 * | 1/2004 | Mijares et al. | 370/401 |
| 6,684,073 B1 | 1/2004 | Joss et al. | |
| 6,697,620 B1 | 2/2004 | Lamb et al. | |
| 6,205,210 B1 | 3/2004 | Rainey et al. | |
| 6,731,926 B1 | 5/2004 | Link, II et al. | |
| 6,738,636 B2 | 5/2004 | Lielbriedis | |
| 6,745,041 B2 | 6/2004 | Allison et al. | |
| 6,795,701 B1 | 9/2004 | Baker et al. | |
| 6,801,781 B1 | 10/2004 | Provost et al. | |
| 6,819,932 B2 | 11/2004 | Allison et al. | |
| 6,826,397 B1 | 11/2004 | Vasa | |
| 6,836,477 B1 | 12/2004 | West, Jr. et al. | |
| 6,850,768 B2 | 2/2005 | Foll | |
| 6,865,191 B1 | 3/2005 | Bengtsson et al. | |
| 6,885,872 B2 | 4/2005 | McCann et al. | |
| 6,912,389 B2 | 6/2005 | Bright et al. | |
| 6,917,612 B2 | 7/2005 | Foti et al. | |
| 6,950,441 B1 | 9/2005 | Kaczmarczyk et al. | |
| 6,993,038 B2 | 1/2006 | McCann | |
| 7,035,239 B2 | 4/2006 | McCann et al. | |
| 7,043,002 B2 | 5/2006 | Delaney et al. | |
| 7,079,524 B2 | 7/2006 | Bantukul et al. | |
| 7,079,853 B2 | 7/2006 | Rathnasabapathy et al. | |
| 7,092,505 B2 | 8/2006 | Allison et al. | |
| 7,113,800 B2 | 9/2006 | Linkola | |
| 7,145,875 B2 | 12/2006 | Allison et al. | |
| 7,181,194 B2 | 2/2007 | McCann et al. | |
| 7,190,959 B2 | 3/2007 | Palmer et al. | |
| 7,221,952 B2 | 5/2007 | Cho et al. | |
| 7,257,401 B1 | 8/2007 | Dizdarevic et al. | |
| 7,286,839 B2 | 10/2007 | McCann et al. | |
| 2001/0006897 A1 | 7/2001 | Kang et al. | |
| 2001/0029182 A1 | 10/2001 | McCann et al. | |
| 2001/0030957 A1 | 10/2001 | McCann et al. | |
| 2001/0040957 A1 | 11/2001 | McCann et al. | |
| 2001/0046856 A1 | 11/2001 | McCann | |
| 2002/0132636 A1 | 9/2002 | Stockhusen | |
| 2002/0147845 A1 | 10/2002 | Sanchez-Herrero et al. | |
| 2002/0173320 A1 | 11/2002 | Aitken et al. | |
| 2002/0176382 A1 | 11/2002 | Madour et al. | |
| 2003/0003930 A1 | 1/2003 | Allison et al. | |
| 2003/0007482 A1 | 1/2003 | Khello et al. | |
| 2003/0016684 A1 | 1/2003 | Prasad et al. | |
| 2003/0026289 A1 | 2/2003 | Mukherjee et al. | |
| 2003/0054844 A1 | 3/2003 | Anvekar et al. | |
| 2003/0061234 A1 | 3/2003 | Ali et al. | |
| 2003/0065788 A1 | 4/2003 | Salomaki | |
| 2003/0081754 A1 | 5/2003 | Esparza et al. | |
| 2003/0109271 A1 | 6/2003 | Lewis et al. | |
| 2003/0157938 A1 | 8/2003 | Haase et al. | |
| 2003/0193967 A1 | 10/2003 | Fenton et al. | |
| 2003/0227899 A1 | 12/2003 | McCann | |
| 2004/0076126 A1 | 4/2004 | Qu et al. | |
| 2004/0081206 A1 | 4/2004 | Allison et al. | |
| 2004/0082332 A1 | 4/2004 | McCann et al. | |
| 2004/0087300 A1 | 5/2004 | Lewis | |
| 2004/0125925 A1 | 7/2004 | Marsot | |
| 2004/0142707 A1 | 7/2004 | Midkiff et al. | |
| 2004/0198351 A1 | 10/2004 | Knotts | |
| 2004/0202187 A1 | 10/2004 | Kelly et al. | |
| 2004/0219935 A1 | 11/2004 | McCann et al. | |
| 2004/0246965 A1 | 12/2004 | Westman et al. | |
| 2005/0003838 A1 | 1/2005 | McCann et al. | |
| 2005/0119017 A1 | 6/2005 | Lovell, Jr. et al. | |
| 2005/0238048 A1 | 10/2005 | Delaney et al. | |

| | | | |
|---|---|---|---|
| 2006/0067338 | A1 | 3/2006 | Hua et al. |
| 2006/0098621 | A1 | 5/2006 | Plata et al. |
| 2006/0136557 | A1 | 6/2006 | Schaedler et al. |
| 2006/0281492 | A1* | 12/2006 | Jiang .............................. 455/558 |
| 2007/0061397 | A1 | 3/2007 | Gregorat et al. |
| 2007/0066326 | A1 | 3/2007 | Agarwal et al. |
| 2007/0133574 | A1 | 6/2007 | Tejani et al. |
| 2007/0254681 | A1 | 11/2007 | Horvath et al. |
| 2008/0248820 | A1 | 10/2008 | Lohtia |
| 2009/0227276 | A1 | 9/2009 | Agarwal et al. |

FOREIGN PATENT DOCUMENTS

| | | | |
|---|---|---|---|
| EP | 0 788 283 | A2 | 8/1997 |
| EP | 0 936 825 | A3 | 8/1999 |
| EP | 0 944 276 | A1 | 9/1999 |
| EP | 1 558 004 | A | 7/2005 |
| EP | 1 742 452 | A1 | 1/2007 |
| EP | 1 950 942 | A1 | 7/2008 |
| WO | WO 95/12292 | A1 | 5/1995 |
| WO | WO 96/11557 | | 4/1996 |
| WO | WO 97/33441 | A1 | 9/1997 |
| WO | WO 98/56195 | | 12/1998 |
| WO | WO 99/11087 | A2 | 3/1999 |
| WO | WO 99/57926 | | 11/1999 |
| WO | WO 00/16583 | A1 | 3/2000 |
| WO | WO 01/47297 | A2 | 6/2001 |
| WO | WO 01/48981 | A1 | 7/2001 |
| WO | WO 01/054444 | A1 | 7/2001 |
| WO | WO 02/060192 | A2 | 8/2002 |
| WO | WO 03/021982 | A1 | 3/2003 |
| WO | WO 03/105382 | A1 | 12/2003 |
| WO | WO 2004/006534 | | 1/2004 |
| WO | WO 2004/087686 | A | 1/2004 |
| WO | WO 2004/075507 | | 9/2004 |
| WO | 2004/102345 | A2 | 11/2004 |
| WO | 10-2004-0107271 | A | 12/2004 |
| WO | WO 2005/002311 | A2 | 1/2005 |
| WO | WO 2005/013538 | A3 | 2/2005 |
| WO | WO 2006/072473 | A1 | 7/2006 |
| WO | WO 2007/045991 | A1 | 4/2007 |
| WO | WO 2007/064943 | A2 | 6/2007 |
| WO | WO 2007/092205 | A2 | 8/2007 |
| WO | WO 2007/095379 | A2 | 8/2007 |
| WO | WO 2007/146257 | A2 | 12/2007 |
| WO | WO 2008/157213 | A2 | 12/2008 |
| WO | WO 2009/023573 | A2 | 2/2009 |

OTHER PUBLICATIONS

Communication pursuant to Article 96(2) EPC for European application No. 04 756 094.1 (Jul. 6, 2007).
Supplementary European Search Report for European application No. 04 756 094.1 (Mar. 29, 2007).
Corrected Notice of Allowance and Fee(s) Due for U.S. Appl. No. 10/607,740 (Mar. 1, 2006).
Notice of Allowance and Fee(s) Due for U.S. Appl. No. 10/607,740 (Sep. 22, 2005).
Notification of Transmittal of the International Search Report and the Written Opinion of the Internatioanl Searching Authority, or the Declaration for International Application No. PCT/US04/20403 (Feb. 8, 2005).
Official Action for U.S. Appl. No. 10/607,740 (Jan. 13, 2005).
Notice of Allowance and Fee(s) Due for U.S. Appl. No. 10/405,859 (Aug. 5, 2010).
Communication Pursuant to Article 94(3) EPC for European Application No. 06844747.7 (May 11, 2010).
Commonly-assigned, co-pending U.S. Appl. No. 12/732,178 for "Methods, Systems, and Computer Readable Media for Providing Home Subscriber (HSS) Proxy," (Unpublished, filed on Mar. 25, 2010).
Notice of Allowance and Fee(s) Due for U.S. Appl. No. 10/405,859 (Mar. 9, 2010).
Final Official Action for U.S. Appl. No. 11/291,502 (Feb. 4, 2010).
"Diameter (Protocol)," Wikipedia, pp. 1-8 (Document last modified on Jan. 16, 2010).
Official Action for U.S. Appl. No. 10/405,859 (Aug. 3, 2009).

Communication pursuant to Article 94(3) EPC for European application No. 06844747.3 (Jul. 28, 2009).
Official Action for U.S. Appl. No. 11/291,502 (May 13, 2009).
Supplementary European Search Report for European Application No. 06844747.3 (Apr. 24, 2009).
Final Official Action for U.S. Appl. No. 10/405,859 (Jan. 6, 2009).
3GPP, "Digital Cellular Telecommunications System (Phase 2+); Universal Mobile Telecommunications System (UMTIS); LTE; IP Multimedia (IM) Subsystem Cx and Dx Interfaces; Signalling Flows and Message Contents," ETSI TS 129 228 V8.4.0 (Jan. 2009).
Notification Concerning Transmittal of Copy of International Preliminary Report on Patentability for International Application No. PCT/US2006/046108 (Oct. 2, 2008).
Notification of Transmittal of the International Search Report and the Written Opinion of the International Searching Authority, or the Declaration for International Application No. PCT/US2006/046108 (Sep. 9, 2008).
Interview Summary for U.S. Appl. No. 10/405,859 (Aug. 20, 2008).
Communication of European publication No. and information on the application of Article 67(3) EPC for Application No. 06844747.3 (Jul. 23, 2008).
Official Action for U.S. Appl. No. 10/405,859 (Mar. 17, 2008).
Restriction Requirement for U.S. Appl. No. 10/405,859 (Feb. 6, 2008).
"IP Multimedia Subsystem," printout from wikipedia.org, Wikimedia Foundation, Inc. (May 29, 2007).
"HP OperCall Home Subscriber Server Software—Data Sheet", 4AA0-3360ENW Rev. 2, Hewlett-Packard Development Company, L.P. (Jul. 2006).
Camarillo et al., "The Session Initiation Protocol (SIP) P-User-Database Private-Header (P-Header)," Network Working Group, RFC 4457, pp. 1-8 (Apr. 2006).
Liu et al., "Introduction to Diameter," IBM, pp. 1-12 (Jan. 24, 2006).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
International Search Report in PCT Application No. 03/32626 (Mar. 5, 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
Walker, "The IP Revolution in Mobile Messaging," Packet, Cisco Systems Users Magazine, vol. 16, No. 1, pp. Cover; 73-74; and 89 (First Quarter 2004).
"Cisco ITP Multilayer Routing (MLR) SMS MO Routing Requirements," Cisco Systems, Inc., p. 1 (Copyright 2004).
"Cisco Signaling Gateway Manager Release 3.2 for Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Moodie, "Agilent acceSS7: White Paper," Agilent Technologies, pp. 1-14 (Apr. 1, 2003).
"Cisco IP Transfer Point," Cisco Systems, Inc., pp. 1-10 (Copyright 1992-2003).
"Cisco IP Transfer Point Multilayer Short Message Serivce Routing Solution," Cisco Systems, Inc., pp. 1-6 (Copyright 1992-2003).
"Cisco ITP MAP Gateway for Public WLAN SIm Authentication and Authorization," Cisco Systems, Inc., pp. 1-13 (Copyright 1992-2003).
Barry, "A Signal for Savings," Packet, Cisco Systems Users Magazine, vol. 14, No. 4, pp. Cover; 19-21; and 81 (Fourth Quarter 2002).
"Agilent Tchnologies and Cisco Systems SS7 Over IP White Paper," Cisco Systems, Inc. and Agilent and Technologies, pp. 1-6 (Copyright 2002-Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).

"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).

"Next-Generation SS7 Networks with the Cisco IP Transfer Point," Cisco Systems, Inc., pp. 1-14 (Copyright 1992-2002).

The attached email dated Oct. 20, 2001 and PowerPoint presentation dated Oct. 24, 2001 disclose an MSISDN-based auto-provisioning solution proposed by a customer of the assignee of the presend application.

"Agilent acceSS7 Business intelligence," Agilent Technologies, pp. 1-6 (Copyright 2001-Printed in the UK Nov. 30, 2001).

"Cisco IP Transfer Point (ITP) Network Management Product Presentation," Cisco Systems, Inc., pp. 1-20 (Copyright 2001).

"Networkers," Cisco Systems, Inc., pp. 1-60 (Copyright 2001).

"Cisco SS7 Signaling Offload," Cisco Systems, Inc., pp. 1-33 (Copyright 1992-2001).

Rockhold, "Or," Wireless Review, pp. 22, 23, 26, 28, 30, 32, (Aug. 15, 2000).

Bertrand, "Jambala Mobility Gateway-Convergence and Inter-System Roaming," Ericsson Review, pp. 89-93.

"Topsail Beach-SS7 Over IP-" Cisco Systems, Inc., pp. 1-16 (Copyright 1999).

ETSI, "Digital Cellular Telecommunications Systems (Phase 2+); Support of Mobile Number Portability (MNP); Technical Realisation; Stage 2," Global System for Mobile Communications, pp. 1-71, (1998).

Smith, "Number Portability Pileup," Telephony, pp. 22, 24, 26, (Jan. 6,1997).

Jain et al., "Phone Number Portability for PCS Sytems with ATM Backbones Using Distributed Dynamic Hashing," IEEE, vol. 15 (No. 1), p. 96-105, (Jan. 1997).

Heinmiller, "Generic Requrements for SCP Application and GTT Function for Number Portability," Illinois Number Portability Workshop, p. 1-50, (Sep. 4, 1996).

International Telecommunication Union, "Series Q: Switching and Signalling: Specifications of Signalling Systems No. 7-Signalling Connection Control Part," p. 11-16, (Jul. 1996).

Rice, "SS7 Networks in a PCS World," Telephony, pp. 138, 140 142, 144, 146, (Jun 24, 1996).

Tekelec, "Eagle STP Planning Guide", Eagle Network Switching Division, (No. 3), p. i-vii, 1-64, A1-A2, B1-2, (May 1996).

Anonymous, "Generic Switching and Singalling Requirements for Number Portability," AT&T Network Systems, No. 1, p. 1-75, (Feb. 2, 1996).

ETSI, Digital Cellular Telecommunications Systems (Phase 2+); Milbe Application Part (MAP) Specifiaction, Global System for Mobile Communcations, pp. 112-114 (1996).

Jain, et al., "A Hashing Scheme for Phone Number Portability in PCS Systems with ATM Backbones," Bell Communications Research, p. 593-597, (1996).

Bishop, "Freeing the Network for Competition," Telecommunications, p. 75-80, (Apr. 1995).

Anonymous, "Zeichengabesysteme-Eine neue Generation für ISDN und intelligente Netze," Zeichengabesystem, Medien-Institut Bremen, p. iz-xi; 170-176, (Feb. 17, 1995).

Giordano et al., "PCS Number Portability," IEEE, p. 1146-1150, (Sep. 1994).

Bellcore, "Signaling Transfer Point (STP) Generic Requirements," Bell Communications Research, No. 1, p. ii-xxii, 4-84-J14, (Jun. 1994).

Telcordia Technologies, "CCS Network interface Specification (CCSNIS) Supporting SCCP and TCAP," Bell Communications Research, p. ii-xii, 1-1—C-22, (Mar. 1994).

Buckles, "Very High Capacity Signaling Trnsfer Point for Intelligent Network Servcies," DSC Communciations Corporation, p. 1308-1311, (1988).

"Diameter Overview," referenced from www.ulticom/html/products/signalware-diameter-reference-guide.asp, Feb. 15, 2007.

"Chapter 1: Overview," SS7 Port Adapter Installation and Configuration, pp. 1-1—1-8, Feb. 15, 2007.

"Confiuring ITP Basic Functionally," IP Transfer Point, Cisco IOS Release 12.2(4)MB12, pp. 31-50, Feb. 15, 2007.

"Configuring ITP Optional Features," IP Transfer Point, Cisco IOS Release 12.294)MB12, pp. 65-136, Feb. 15, 2007.

"Configuring M3UA and SUA SS7 Over IP Signaling Gateways," IP Transfer Point, Cisco IOS Release 12.2(4)MB13, pp. 51-66, Feb. 15, 2007.

"Configuring M3UA and SUA SS7 Over IP Signaling Gateways," IP Transfer Point, Cisco IOS Release 12.2(4)MB10, pp. 49-62, Feb. 15, 2007.

* cited by examiner

METHODS, SYSTEMS, AND COMPUTER READABLE MEDIA FOR SELECTIVELY PROCESSING OR REDIRECTING SIGNALING CONNECTION CONTROL PART (SCCP) MESSAGES

RELATED APPLICATIONS

This application claims the benefit of U.S. Provisional Patent Application Ser. No. 60/773,604, filed Feb. 15, 2006; the disclosure of which is incorporated herein by reference in its entirety.

TECHNICAL FIELD

The subject matter described herein relates to processing SCCP messages. More, particularly, the subject matter described herein relates to methods, systems, and computer program products for selectively processing or redirecting SCCP messages.

BACKGROUND

In telecommunications networks, it is often desirable to provide new services to telecommunications subscribers. For example, in mobile communications networks, it may be desirable to migrate subscribers from one protocol, such as Interim Standard 41 (IS-41), to a new protocol, such as Global System for Mobile Communications (GSM) that provides new services. In such networks, since subscribers may not all be migrated at the same time, the network may include IS-41 subscribers, GSM subscribers, IS-41 switches, GSM switches, IS-41 HLRs and GSM HLRs.

In such a network, IS-41 switches may be the legacy switches. It is desirable to provide the capability for these legacy switches to correctly route calls and send signaling messages relating to migrated subscribers and new GSM subscribers. One method for allowing IS-41 switches to correctly route calls and send signaling messages relating to migrated and new GSM subscribers is to modify the switches to send signaling messages route-on-global-title (route-on-GT). In some networks, IS-41 switches send signaling messages, such as signaling connection control part (SCCP) messages, route-on-point-code-subsystem-number (route-on-PC-SSN). Messages that are sent route-on-PC-SSN are typically addressed to the final destination, such as the IS-41 HLR. Messages that are sent route-on-GT are typically addressed to the point code of an intermediate node, such as an STP, that performs global title translation, determines the destination for the messages, and routes the messages to the destination. Modifying IS-41 switches that send messages route-on-PC-SSN to send messages route-on-GT may not be cost effective, especially in networks where there is a large base of installed switches.

More generally, the problem of modifying switching offices that send messages route-on-PC-SSN to send any type of SCCP messages route-on-GT can be expensive where there is a large base of installed switches. Accordingly, there exists a need for selectively processing or redirecting messages sent route-on-PC-SSN to a destination using an intermediate node, such as an STP. One problem with using an STP to process messages that are sent route-on-PC-SSN is that STPs typically route such messages, rather than apply internal processing. One exception where STPs apply internal processing to messages sent route-on-PC-SSN is when an STP includes a number portability database, such as an LNP database. If an STP includes an internal LNP database, the STP terminates and processes all LNP queries that are addressed to the STP. However, there is no provisioned capability in an LNP-equipped STP to selectively process some LNP queries that are addressed to the STP and redirect other LNP queries that are addressed to the STP to a destination.

Accordingly, in light of these difficulties, there exists a need for methods, systems, and computer program products for selectively processing or redirecting SCCP messages.

SUMMARY

The subject matter described herein includes methods, systems, and computer program products for selectively processing or redirecting SCCP messages. According to one method, an SCCP message addressed to an STP and sent route-on-PC-SSN is received at the STP. It is determined whether the SCCP message can be processed locally by the STP. In response to determining that the SCCP message can be processed locally by the STP, the SCCP message is terminated, processed locally, and a response is sent to the message originator. In response to determining that the SCCP message cannot be processed locally at the STP, the message is redirected to a destination.

The subject matter described herein for selectively processing or redirecting SCCP messages can be implemented using a computer program product comprising computer executable instructions embodied in a computer readable medium. Exemplary computer readable media suitable for implementing the subject matter described herein include chip memory devices, disk memory devices, programmable logic devices, and application specific integrated circuits. In addition, a computer program product that implements the subject matter described herein can be located on a single device for computing platform or may be distributed across multiple devices for computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
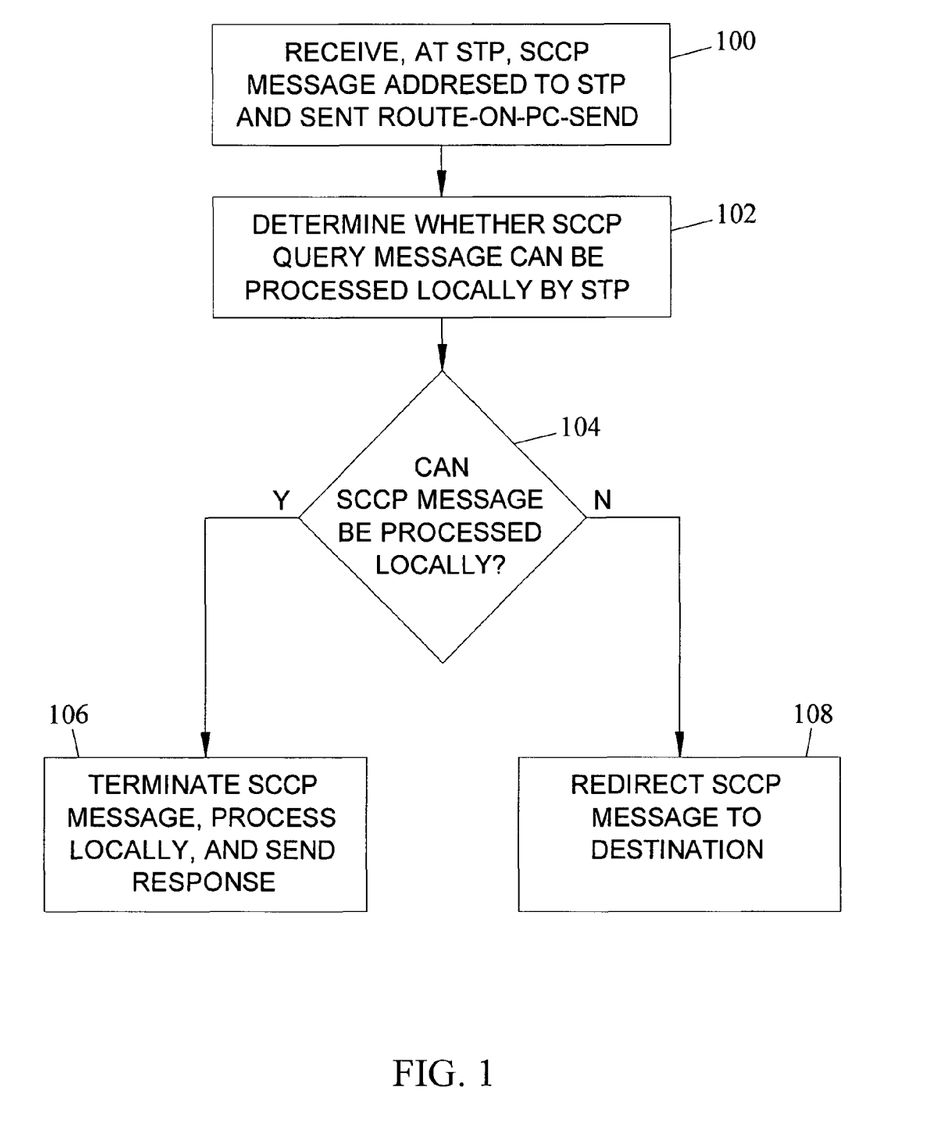
FIG. 1 is a flow chart illustrating an exemplary process for selectively processing or redirecting SCCP messages according to an embodiment of the subject matter described herein.
Figure 2:
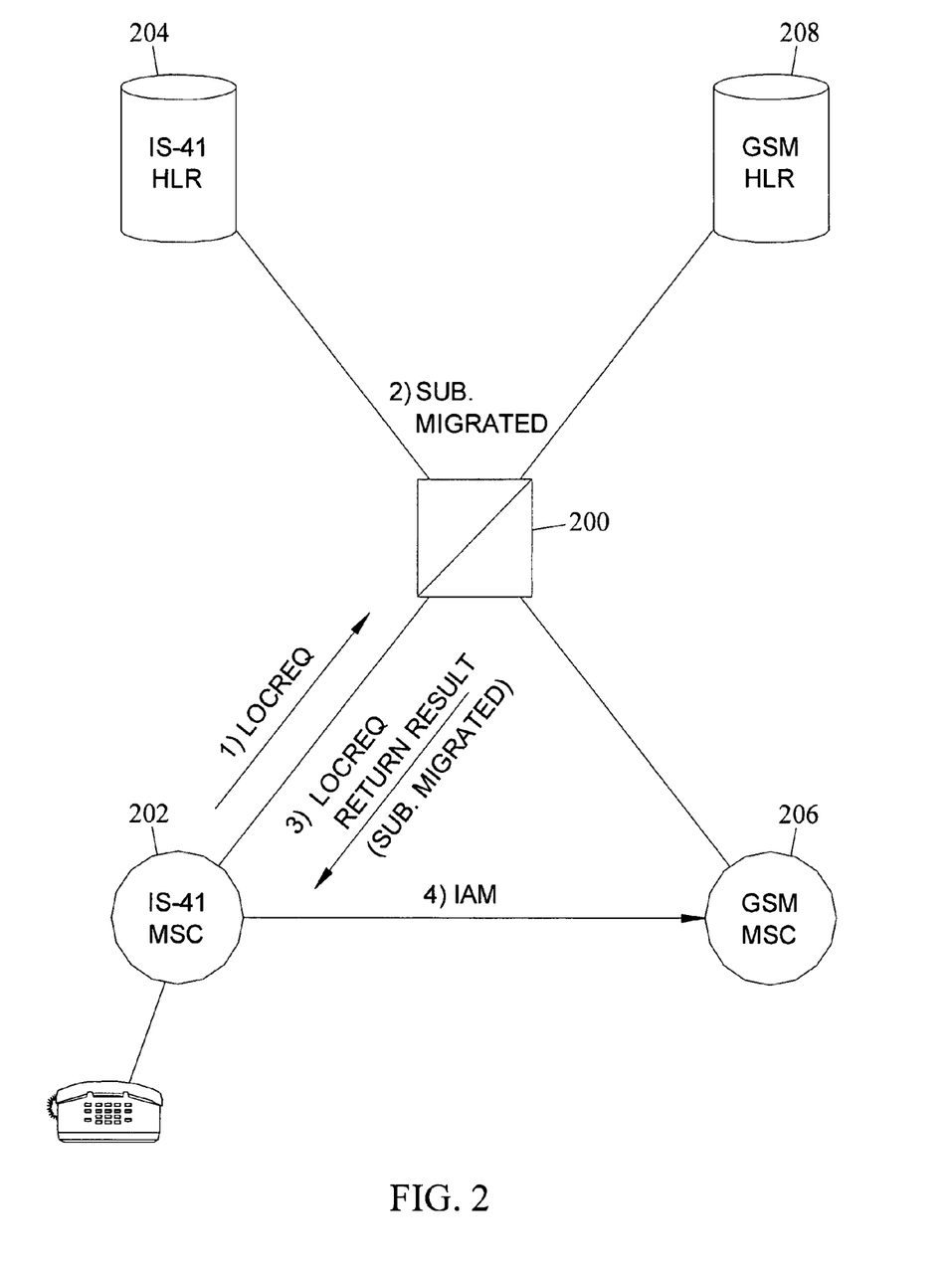
FIG. 2 is a network diagram illustrating exemplary messages exchanged for an SCCP message that is processed by an STP according to an embodiment of the subject matter described herein.

The subject matter described herein includes methods, systems, and computer program products for selectively processing or redirecting SCCP messages. The subject matter described herein may be implemented at a node that is located between a network switching system, such as a mobile switching center (MSC) or a service switching point (SSP), and a destination node, such as a home location register (HLR) or a service control point (SCP), that may be configured to process some of the SCCP messages. In one implementation, the subject described herein may be implemented in a signal transfer point (STP). FIG. 1 is a flow chart illustrating exemplary steps that may be performed for selectively processing or redirecting SCCP messages according to an embodiment of the subject matter described herein. Referring to FIG. 1, in block 100, an SCCP message addressed to an STP and sent route-on-PC-SSN is received at the STP. Referring to the network example illustrated in FIG. 2, an STP 200 may be located in a network that includes an IS-41 MSC 202, an IS-41 HLR 204, a GSM MSC 206, and a GSM HLR 208. When IS-41 MSC 202 receives an initial address message (IAM) message or other message to initiate a call to a mobile subscriber, IS-41 MSC 202 may send a location request message to determine the location of the called party. In this implementation, the location request message is sent route-on-PC-SSN. The location request message is addressed to a capability point code of STP 200. The capability point code is a point code that is used by STP 200 to identify SCCP messages that may be processed locally at the STP or redirected.

Returning to FIG. 1, in blocks 102 and 104, it is determined whether the SCCP message can be processed locally by the STP. If it is determined that the SCCP message can be processed locally, the SCCP message is terminated, processed locally, and a response is sent to the message originator. Returning to FIG. 2, when STP 200 receives the location request message, STP 200 will recognize the message as being addressed to its capability point code for selective SCCP message processing or redirection. In one implementation, STP 200 determines whether it can process the SCCP message locally by determining whether the called party identified by the location request message has migrated to GSM or not. In this example, it is determined that the subscriber has migrated to GSM. Accordingly, STP 200 formulates a location request return result message indicating that the subscriber has been migrated. STP 200 sends the location request return result message to IS-41 MSC 202. IS-41 MSC 202 forwards the call to GSM MSC 206 by sending an IAM message to GSM MSC 206. GSM MSC 206 will then issue a send routing information (SRI) message to GSM HLR 208 to determine the location of the called party. Thus, in FIG. 2, STP 200 determines that it can process an SCCP message locally, and processes the message.

Figure 3:
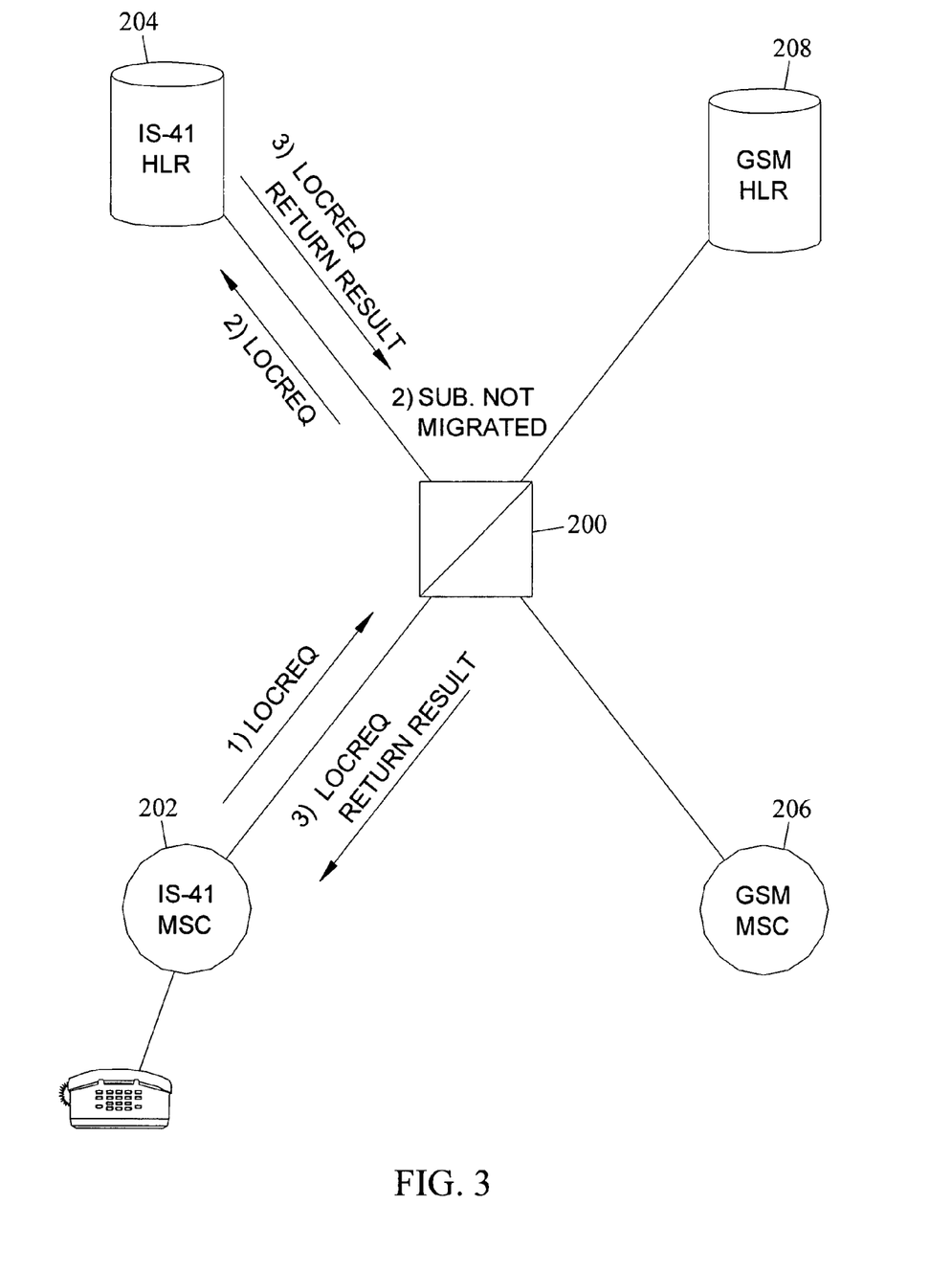
FIG. 3 is a network diagram illustrating exemplary messages exchanged between network nodes for an SCCP message that is redirected by an STP according an embodiment of the subject matter described herein.

Returning to FIG. 1, in block 104, if it is determined that the SCCP message cannot be processed locally, control proceeds to block 108 where the message is redirected to a destination for processing. Referring to FIG. 3, a location request message originates from IS-41 MSC 202 in response to an incoming mobile terminated call. The location request message is sent route-on-PC-SSN to the capability point code of STP 200 for selective SCCP message processing or redirection. In this example, it is assumed that the called party has not migrated to GSM. Accordingly, STP 200 may determine that it cannot process the query message because the subscriber has not migrated. In this case, STP 200 may redirect the location request message to IS-41 HLR 204. IS-41 HLR 204 may perform a lookup using a subscriber identifier in the location request message and determine the current location of the subscriber. IS-41 HLR 204 may then send a location request return result message to IS-41 MSC 202 via STP 200 indicating the location of the subscriber.

In one exemplary implementation, in order to redirect the received SCCP message to IS-41 HLR 204, STP 200 may copy the called party point code from the SCCP portion of the message and place the called party point code in the MTP routing label of the message. This implementation requires that the IS-41 MSC 202 insert the point code of the IS-41 HLR in the called party point code field of the SCCP query message. Thus, in the example illustrated in FIG. 3, STP 200 redirects a message that was sent to it route-on-PC-SSN in response to determining that STP 200 cannot process the message.

Figure 4:
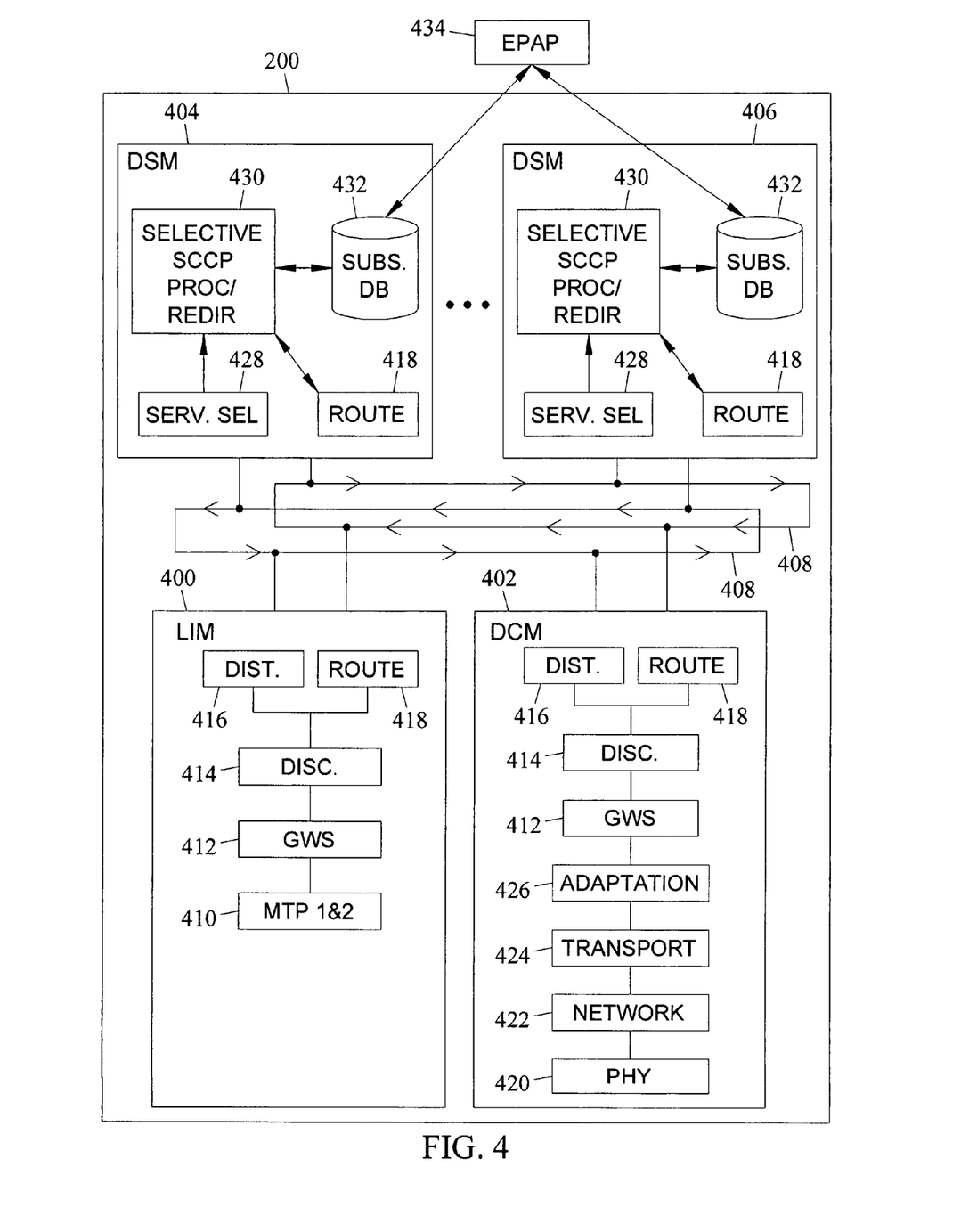
FIG. 4 is a block diagram illustrating an exemplary internal architecture for an STP that selectively processes or redirects SCCP messages according to an embodiment of the subject matter described herein.

FIG. 4 is a block diagram illustrating exemplary components of STP 200 for selectively processing or redirecting SCCP messages according to an embodiment of the subject matter described herein. Referring to FIG. 4, STP 200 includes a plurality of internal processing modules 400, 402, 404, and 406 connected via a counter-rotating, dual ring bus 408. In the illustrated example, the processing modules include a link interface module (LIM) 400 for interfacing with SS7 signaling links, a data communications module (DCM) 402 for interfacing with IP signaling links, and database services modules (DSMs) 404 and 406 for performing database-related services, such as selectively processing or redirecting SCCP query messages.

LIM 400 includes a message transfer part (MTP) level one and two function 410 for performing SS7 MTP level one and two operations, such as sequencing, error detection, and error correction of SS7 signaling messages sent over SS7 signaling links. Gateway screening function 412 screens incoming SS7 messages to determine whether to allow the messages into the network. Discrimination function 414 screens incoming SS7 messages to determine whether the messages require internal processing by STP 200 or whether the messages should be routed. Distribution function 416 receives messages identified by discrimination function 414 as requiring internal processing by STP 200. Distribution function 416 distributes the messages to an internal processing module, such as DSM 404 or 406 for internal processing. Routing function 418 routes messages identified by discrimination function 414 as requiring routing.

As stated above, normally, messages that are sent to an STP route-on-PC-SSN are routed by a routing function, such as routing function 418, to a destination. However, according to the subject matter described herein, SCCP query messages that may require internal processing by STP 200 or redirection are addressed to a capability point code of STP 200. For such messages, discrimination function 414 may identify the messages as requiring internal processing (either redirection or local termination) and forward such messages to distribution function 416. Distribution function 416 may then forward such messages to one of DSM cards 404 and 406 for internal processing.

DCM card 402 includes functionality for interfacing with IP signaling links, and in particular, for interfacing with IP signaling links that carry IP-encapsulated SS7 signaling messages. In the illustrated example, DCM 402 includes a physical layer function 420, a network layer function 422, a transport layer function 424, an adaptation layer function 426, and functions 410-418 described with regard to LIM 400. Physical layer function 420 performs OSI physical layer operations, such as error correction and error detection of messages sent over OSI layer one and two signaling links. In one implementation, physical layer function 420 may be implemented using Ethernet. Network layer function 422 performs operations, such as network layer routing of signaling messages. In one implementation, network layer function may be implemented using Internet protocol. Transport layer function 424 performs OSI transport layer functions, such as connection-oriented or stream-oriented transport of messages. Transport layer function may be implemented using transmission control protocol, user datagram protocol, or stream control transmission protocol. Adaptation layer function 426 performs operations for sending and receiving SS7 messages over IP transport. Adaptation layer function 426 may be implemented using any Sigtran adaptation layer protocol, such as SUA, M3UA, M2PA, or other suitable protocol. Functions 410-418 may perform the same operations as the correspondingly numbered functions described with regard to LIM 400. Hence, a description thereof will not be repeated herein.

It should be noted that the subject matter described herein for selectively processing or redirecting SCCP messages is capable of performing the processing or redirection for SCCP messages that are sent over IP transport as well as messages that are sent over SS7 transport. Thus, the term "SCCP message" as described herein is not intended to be limited to messages that are sent using SS7 transport across a network. An IP encapsulated SCCP message received by DCM card 402 would be unencapsulated and forwarded to one of DSM cards 404 and 406 for selective processing or redirection, if it is addressed to the capability point code of STP 200 described above.

DSMs 404 and 406 may be identically provisioned to provide database-related and/or other services in a load sharing manner. In the illustrated example, one database-related service that is provided is selective SCCP processing or redirection. Each DSM 404 and 406 may be provisioned with a service selection function 428 that identifies an SCCP service for an incoming SCCP query message. For messages addressed to the capability point code of selective SCCP message processing or redirection, service selection function 428 may forward such messages to selective SCCP processing/redirection function 430. Selective SCCP processing/redirection function 430 may perform a lookup in subscriber database 432 to determine whether an SCCP message can be processed locally or not. In the migration example described above, messages directed to migrated subscribers may be processed locally and messages that are directed to non-migrated subscribers may be redirected. Subscriber database 432 may include entries indexed by subscriber identifiers, such as IMSIs, MSISDN numbers, or directory numbers. Each entry may include an indication as to whether a subscriber is migrated. Alternatively, database 432 may be populated only with entries for migrated subscribers, eliminating the need to store migration status indicators in the database entries. Subscriber database 432 may be provisioned by an external provisioning platform, referred to as Eagle® Provisioning Application Processor (EPAP) 434.

For messages that are processed locally, selective SCCP processing/redirection function 430 may terminate such messages, formulate response messages, and forward the response messages to the message originator. The response messages will be routed by routing function 418 to the appropriate LIM or DCM associated with the signaling link corresponding to the destination point code in the message. For messages that cannot be processed locally, selected SCCP processing/redirection function 430 may extract the SCCP called party point code from such messages and replace the MTP destination point code with the SCCP called party point code. Selective SCCP processing/redirection function 430 may forward such messages to routing function 418. Routing function 418 may route such messages to the LIM or DCM associated with the destination point code in the message.

Although the examples described above relate to selectively processing or redirecting SCCP messages relating to mobility management in a network that allows subscriber migration between mobile signaling protocols, the subject matter described herein is not limited to these examples. For example, the methods and systems described above for selectively processing or redirecting SCCP messages can be used to process or redirect any type of SCCP message that is sent route-on-PC-SSN. Examples of other SCCP messages that may be selectively processed or redirected include mobile subscriber registration messages that require G-FLEX processing at the STP. As used herein, the term "G-FLEX processing" refers to processing at the STP in order to determine an HLR to which a mobile subscriber location management message should be routed. Typically, G-FLEX queries are sent route-on-GT. The subject matter described herein allows such messages to be sent to a point code of an STP and route-on-PC-SSN.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for selectively processing or redirecting signaling connection control part (SCCP) messages, the method comprising:
    receiving, at a signal transfer point, an SCCP message that is both addressed to the signal transfer point and sent route-on-point-code-subsystem-number (route-on-PC-SSN), wherein the SCCP message includes a request for the location of a called party;
    determining whether the SCCP message can be processed locally by the STP;
    in response to determining that the SCCP message can be processed locally by the STP, processing the SCCP message locally at the STP and sending a response to an originator of the SCCP message, wherein the response indicates that the called party is a Global System for Mobile Communications (GSM) subscriber, wherein processing the SCCP message locally at the STP includes terminating the message at the STP rather than routing the message; and
    in response to determining that the SCCP message cannot be processed locally at the STP, redirecting the SCCP message from the STP to a destination by altering a message transfer part (MTP) point code in the SCCP message.

2. The method of claim 1 wherein the SCCP message comprises a mobility management message in a network that supports mobile subscriber migration between mobile signaling protocols.

3. A method for selectively processing or redirecting signaling connection control part (SCCP) messages, the method comprising:
    receiving, at a signal transfer point, an SCCP message that is both addressed to the signal transfer point and sent route-on-point-code-subsystem-number (route-on-PC-SSN);
    determining whether the SCCP message can be processed locally by the STP;
    in response to determining that the SCCP message can be processed locally by the STP, processing the SCCP message locally at the STP and sending a response to an originator of the SCCP message; and
    in response to determining that the SCCP message cannot be processed locally at the STP, redirecting the SCCP message from the STP to a destination, wherein the SCCP message comprises a mobility management message in a network that supports mobile subscriber migration between mobile signaling protocols and wherein determining whether the SCCP message can be processed locally by the STP includes determining whether a subscriber associated with the SCCP message has migrated or not migrated between the mobile signaling protocols.

4. The method of claim 3 where comprising determining that the SCCP message can be processed locally at the STP in response to determining that the subscriber has migrated between the mobile signaling protocols.

5. The method of claim 3 comprising determining that the SCCP message cannot be processed at the STP in response to determining that the subscriber has not migrated between the mobile signaling protocols.

6. A method for selectively processing or redirecting signaling connection control part (SCCP) messages, the method comprising:
receiving, at a signal transfer point, an SCCP message that is both addressed to the signal transfer point and sent route-on-point-code-subsystem-number (route-on-PC-SSN);
determining whether the SCCP message can be processed locally by the STP;
in response to determining that the SCCP message can be processed locally by the STP, processing the SCCP message locally at the STP and sending a response to an originator of the SCCP message; and
in response to determining that the SCCP message cannot be processed locally at the STP, redirecting the SCCP message from the STP to a destination, wherein redirecting the SCCP message to a destination includes copying an SCCP called party point code into a message transfer part (MTP) routing label of the message and routing the SCCP message to a destination corresponding to the copied point code.

7. The method of claim 6 wherein routing the SCCP message to a destination includes routing the message to a home location register (HLR).

8. The method of claim 1 wherein the SCCP message comprises a message requiring G-FLEX processing.

9. A system for selectively processing or routing signaling connection control part (SCCP) messages, the system comprising:
a signal transfer point including:
an interface module for receiving SCCP messages that are both addressed to a point code of the STP and sent route-on-point-code-subsystem-number (route-on-PC-SSN) and for identifying the SCCP messages as requiring at least some internal processing by the STP, wherein each of the SCCP messages includes a request for the location of a called party; and
a services module for receiving the SCCP messages that are identified as requiring at least some internal processing by the STP, for determining whether each of the SCCP messages can be processed locally by the STP, for messages identified as being able to be processed locally, for terminating and processing the SCCP messages locally rather than routing the messages and sending, to an originator of the of the request, a response indicating that the called party is a Global System for Mobile Communications (GSM) subscriber, and for messages identified as not being able to be processed locally by the STP, for redirecting such messages to a destination by altering a message transfer part (MTP) point code in the messages.

10. The system of claim 9 wherein the services module selectively processes or redirects mobility management messages in a network allowing subscriber migration between mobile signaling protocols.

11. A system for selectively processing or routing signaling connection control part (SCCP) messages, the system comprising:
a signal transfer point including:
an interface module for receiving SCCP messages that are both addressed to a point code of the STP and sent route-on-point-code-subsystem-number (route-on-PC-SSN) and for identifying the SCCP messages as requiring at least some internal processing by the STP; and
a services module for receiving the SCCP messages that are identified as requiring at least some internal processing by the STP, for determining whether each of the SCCP messages can be processed locally by the STP, for messages identified as being able to be processed locally, for terminating and processing the SCCP messages locally, and for messages identified as not being able to be processed locally by the STP, for redirecting such messages to a destination, wherein the services module is adapted to selectively process or redirect mobility management messages in a network allowing subscriber migration between mobile signaling protocols and wherein the services module determines whether subscribers are migrated or non-migrated.

12. The system of claim 11 wherein the services module processes and terminates mobility management messages directed to migrated subscribers.

13. A system for selectively processing or routing signaling connection control part (SCCP) messages, the system comprising:
a signal transfer point including:
an interface module for receiving SCCP messages that are both addressed to a point code of the STP and sent route-on-point-code-subsystem-number (route-on-PC-SSN) and for identifying the SCCP messages as requiring at least some internal processing by the STP; and
a services module for receiving the SCCP messages that are identified as requiring at least some internal processing by the STP, for determining whether each of the SCCP messages can be processed locally by the STP, for messages identified as being able to be processed locally, for terminating and processing the SCCP messages locally, and for messages identified as not being able to be processed locally by the STP, for redirecting such messages to a destination, wherein the services module redirects mobility management messages directed to non-migrated subscribers.

14. The system of claim 13 wherein, in redirecting the mobility management messages, the services module is adapted to copy an SCCP called party point code in each message to a message transfer part (MTP) routing label of each message.

15. The system of claim 13 wherein the services module routes the redirected SCCP messages to an HLR.

16. The system of claim 13 wherein at least some of the SCCP messages comprises messages requiring G-FLEX processing.

17. A non-transitory computer readable medium having stored thereon computer executable instructions that when executed by a computer perform steps comprising:
receiving, at a signal transfer point, an SCCP message that is both addressed to the signal transfer point and sent route-on-point-code-subsystem-number (route-on-PC- SSN), wherein the SCCP message includes a request for the location of a called party;

determining whether the SCCP message can be processed locally by the STP;

in response to determining that the SCCP message can be processed locally by the STP, processing the SCCP message locally at the STP and sending a response to an originator of the SCCP message, wherein the response indicates that the called party is a Global System for Mobile Communications (GSM) subscriber, wherein processing the SCCP message locally at the STP includes terminating the SCCP message at the STP rather than routing the message; and in response to determining that the SCCP message cannot be processed locally at the STP, redirecting the SCCP message from the STP to a destination, by altering a message transfer part (MTP) point code in the SCCP message.

* * * * *